United States Patent Office 2,795,526
Patented June 11, 1957

2,795,526

METHODS FOR REPELLING INSECTS WITH POLY-
CYCLIC ALDEHYDES AND ALCOHOLS

Lyle D. Goodhue and James T. Edmonds, Jr., Bartlesville,
Okla., assignors to Phillips Petroleum Company, a corporation of Delaware No Drawing. Application December 21, 1953,
Serial No. 399,615

10 Claims. (Cl. 167—33)

This invention relates to a method for repelling insects from a surface by applying to such a surface a polycyclic material defined herein. In one aspect this invention relates to insect repellents containing as an essential active ingredient a polycyclic material described herein. In still another aspect this invention relates to areas, rendered insect repellent by the presence thereon of a polycyclic material above referred to. In still another aspect this invention relates to 2,3,4,5-bis($\Delta^2$-butenylene)tetrahydrofurfuryl alcohol, and 2,3,4,5-bis(butylene)tetrahydrofurfural, and 2,3,4,5-bis(butylene)tetrahydrofurfuryl alcohol, and derivatives of these compounds, as insect repellents.

Insects such as roaches, flies and others are troublesome pests in homes, restaurants, grocery stores, and the like, especially in warm climates where out-of-door infestation is present all year.

We have now discovered that polycyclic compounds described hereinafter are effective agents for repelling insects such as biting flies, house flies, cockroaches, mosquitoes, and the like, and for repelling members of the order of Arachnida such as ticks, red spiders, chiggers, common spiders, and the like, from surfaces frequented by them when applied to said surfaces in suitable form such as solution, dust, emulsion or the like.

In accordance with this invention, insect repellents have been provided containing as an essential active ingredient, at least one polycyclic compound characterized by a structural formula selected from the group consisting of

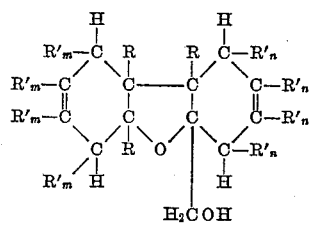

FORMULA I

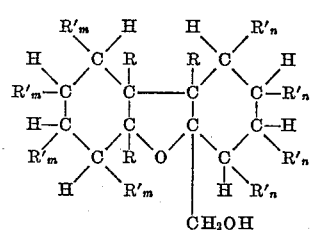

FORMULA II and

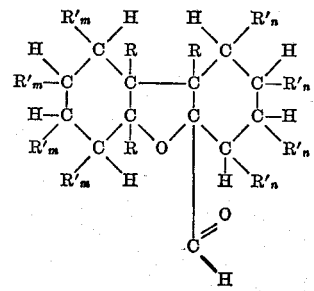

FORMULA III wherein each R is a radical selected from the group consisting of hydrogen and methyl and at least one R is hydrogen, wherein each R' is a radical selected from the group consisting of hydrogen and an alkyl group having not more than three carbon atoms, wherein the sum of the carbon atoms in the R'$_m$ and R'$_n$ radicals is in each case not greater than three and wherein at least two of the R'$_m$ and at least two of the R'$_n$ radicals are hydrogen.

In accordance with another concept, this invention provides a method for repelling insects from an area or surface, generally in the absence of the insect, by applying to the said area at least one of the above-defined polycyclic compounds.

In still another concept, this invention provides areas or surfaces which are insect repellent and contain deposited thereon at least one of the above-described polycyclic compounds.

When in the structural formulas, above set forth, all R's and R"'s are hydrogen, the three compounds are respectively, 2,3,4,5-bis($\Delta^2$-butenylene)tetrahydrofurfuryl alcohol, 2,3,4,5-bis(butylene)tetrahydrofurfuryl alcohol, and 2,3,4,5-bis(butylene)tetrahydrofurfural.

Preparation of 2,3,4,5-bis($\Delta^2$-butenylene)tetrahydrofurfuryl alcohol, and defined derivatives thereof, is disclosed in the application of John C. Hillyer, Serial No. 255,520, filed November 8, 1951, and these compounds are claimed in the last said copending application.

Preparation of 2,3,4,5-bis(butylene)tetrahydrofurfuryl alcohol and 2,3,4,5-bis(butylene)tetrahydrofurfural and their defined derivatives are disclosed and claimed in the copending application of John C. Hillyer, Serial No. 396,321, filed December 4, 1953.

Preparation of 2,3,4,5-bis($\Delta^2$-butenylene)tetrahydrofurfuryl alcohol and its defined derivatives are disclosed and claimed in the copending application of John C. Hillyer, Serial No. 255,520, filed November 8, 1951, now U. S. Patent No. 2,687,419.

The preparations referred to in each of the above-said copending applications, are in certain embodiments conducted by way of effecting reduction of olefinic double bonds and/or aldehydes groups of 2,3,4,5-bis($\Delta^2$-butenylene)tetrahydrofurfural and derivatives thereof; the last said compounds being disclosed and claimed in the copending application of John C. Hillyer and Daniel A. Nicewander, Serial No. 81,413, filed March 14, 1949, now U. S. Patent No. 2,683,151, issued July 6, 1954.

The control of stable flies is a particularly important problem on farms and ranches. The stable fly *Stomoxys calcitrans* (Linn.) is a bad pest of domestic animals, particularly of cattle and horses. The stable flies have long piercing mouth parts which they use to penetrate the skin of the animal and feed on the animal. They worry the animals continuously, and weaken them by sucking their blood. This results in great economic loss. In the case of dairy cows milk production diminishes markedly when the cows are bothered by large numbers of stable flies.

We have found that the repellent compounds of this invention, particularly 2,3,4,5-bis($\Delta^2$-butenylene)tetrafurfuryl alcohol and its defined derivatives, are especially effective as repellents of stable flies and of roaches. When these compounds are applied to either the surface of the animal and/or to the nearby surface areas, such as the walls and stalls of barns, they serve to repel the stable fly for a considerable period of time. In general, they give the greatest protection to the animal when applied directly to the animal itself.

The repellent materials of this invention are also effective in repelling other insects and Arachnid pests such as horn fly, house flies, mosquitoes and cockroaches from surfaces frequented by them.

The repellent materials of this invention can be applied for their intended purpose in several ways, as a solution, emulsion, aerosol, fog, dust, as a concentrate in which it is prepared, or in other manner. A preferred method of application is to spray a liquid composition on a surface from which insects such as roaches and flies are to be repelled. Thus, we have found it advantageous to dissolve the repellent material in a solvent or otherwise employ it in a suitable liquid carrier and apply the composition so formed.

Solvents or carriers which we have found applicable to the present invention include those which have no detrimental effect upon the repellent activity of our repellent materials, i. e., which are substantially inert to the active repellent ingredient, and which, when the composition is applied to live stock is substantially non-irritating and non-toxic to the animal. Among the carrier materials which are particularly suitable, are petrolatum, deodorized kerosene, isoparaffinic hydrocarbon fraction known as Soltrol and other liquid purified hydrocarbons. Solid inert carriers, especially suitable, include talc, kieselguhr, and other inert carriers which may be used in preparing dusts. The active repellent ingredient may be applied in the form of an aqueous emulsion. Thus, the repellent, if liquid, may be emulsified directly with water, or, if desired, it may first be dissolved in a substantially water-insoluble solvent, such as one of the aforementioned solvents, and the resulting solution emulsified with water. Any suitable emulsifying agent may be employed, such as, for example, Triton X100 (alkylated aryl polyether alcohol), Tween 20 (sorbitan monolaurate polyoxyethylene derivative) and the like.

The repellent materials of our invention can be applied for their intended purpose in several ways. They can be sprayed, brushed, or dusted on the surface to be treated. The preferred way is to spray a liquid composition on the surface to be treated. However, aerosols are employed advantageously in closed areas, when application is to be made to structural surfaces rather than to animals.

Generally, it is advantageous to make application of the repellent in a manner so as to deposit from 5 to 50 grams of the active ingredient per 100 square feet of surface. However, larger or smaller amounts can be applied as desired, amounts in the order of down to 0.5 gram or less per 100 square feet of surface being applicable, although generally, when such a small amount of active ingredient is deposited, the period during which the surface is insect repellent is relatively short as compared with that when 5 grams or more of active ingredient per 100 square feet of surface is applied.

The repellent materials of our invention can be used in admixture with each other when desired.

Our invention is illustrated by way of the following examples:

EXAMPLE 1

Organdy bags having 100 square inches of area were impregnated with the desired amount of chemical dissolved in 6 to 7 ml. of acetone and were then suspended on a line to dry. After 24 hours, the bags were drawn over the hand and exposed to several thousand hungry stable flies *Stomoxys calcitrans* (Linn.) confined in 30-inch cubical cages. The flies were those reared according to the method reported by Campau, Baker, and Morrison, J. Econ. Entomology, 46, 524 (1953). The time to the first bite was recorded. If no bites were received in five minutes, one of two procedures was followed: (1) The bag was withdrawn and shortly thereafter reinserted into the cage for a second five minute period. This was repeated until the bag had been inserted for a total of three successive five minute periods. On following days, three additional successive tests were made. Generally, the flies bite in less than a minute if they bite at all. (2) The bags are inserted in the cages for one five minute period only, and tested once only on successive days. In both procedures, the bags are suspended open to aeration between trials on successive days.

In the table below are given the results using 2,3,4,5-bis($\Delta^2$-butenylene)tetrahydrofurfuryl alcohol, prepared by the reduction of the aldehyde group of 2,3,4,5-bis-($\Delta^2$-butenylene)tetrahydrofurfural by the crossed Cannizzaro reaction, as described in Example 1 of Serial No. 255,520, the copending application of John C. Hillyer, filed November 8, 1952.

Table 1

REPELLENCY OF 2,3,4,5-BIS($\Delta^2$-BUTENYLENE) TETRAHYDROFURFURYL ALCOHOL TO STABLE FLIES

| Grams of Chemical per 100 sq. in. Fabric | Successive Trial Number | Seconds to First Bite, Bags Aged | | | | |
|---|---|---|---|---|---|---|
| | | 1 Day | 2 Days | 3 Days | 4 Days | 5 Days |
| 0.5 (a) | 1 | NB* | NB | 270 | | |
| | 2 | NB | NB | 210 | | |
| | 3 | NB | NB | 290 | | |
| 1.0 (a) | 1 | NB | NB | NB | NB | 100 |
| | 2 | NB | NB | NB | NB | 97 |
| | 3 | NB | NB | NB | NB | 86 |
| 0.5 (b) | 1 | NB | NB | 17 | | |

*NB = No bites in 5 minutes.
(a) = Purified material.
(b) = Crude material.

EXAMPLE 2

In accordance with the Sandwich Bait Method described by L. B. Kilgore in Soap, June 1949, several 1 x 4 inch strips of cardboard were coated with a smooth thin film of unsulfured molasses leaving an uncoated margin about ¼ inch on all four sides. The prepared cardboard strips were then oven-dried at 45° C.

Highly porous paper strips were separately impregnated with 2,3,4,5-bis($\Delta^2$-butenylene)tetrahydrofurfuryl alcohol and with 2,3,4,5-bis(butylene)tetrahydrofurfuryl alcohol, in varied amounts. Impregnation of the porous strips was effected by immersing them in an acetone solution of the compound, and then allowing the strip to dry over a period of from 4 to 6 hours. The impregnated strips were the same size as the baited cardboards. An impregnated strip was superimposed on each baited cardboard and fastened in place by stapling. The loose fiber construction of the impregnated paper permits the fly to remove the molasses through it.

The prepared strips, i. e., the sandwich bait, were then exposed to house flies (*Musca domestica*), over 5 days old, which had been starved for 6 hours. Counts of the number of flies feeding on the strips were taken periodically for 2½ hours. A non-repellent material in the sandwich bait becomes black with flies soon after being exposed and the bait will often be entirely consumed in 5 minutes.

The results of the tests of 2,3,4,5-bis($\Delta^2$-butenylene)-tetrahydrofurfuryl alcohol and of 2,3,4,5-bis(butylene)-tetrahydrofurfuryl alcohol as a fly repellent in accordance with the method described above are tabulated as follows:

*Table 2*

| Chemical | Concentration[1] of Dipping Solution, Percent | Number of Flies Feeding, Minutes | | | | | | | |
|---|---|---|---|---|---|---|---|---|---|
| | | 5 | 15 | 30 | 45 | 60 | 90 | 120 | 150 |
| 2,3,4,5-Bis($\Delta^2$-butenylene) tetrahydrofurfuryl alcohol (purified) | 2 | 0 | 0 | 0 | 0 | 6 | 0 | 8 | 1 |
| | 1 | 0 | 0 | 3 | 10 | 21 | 21 | 8 | (²) |
| 2,3,4,5-Bis($\Delta^2$-butenylene) tetrahydrofurfuryl alcohol (crude) | 2 | 0 | 0 | 0 | 0 | 6 | 0 | 8 | 1 |
| | 1 | 0 | 0 | 0 | 0 | 5 | 0 | 5 | (²) |
| 2,3,4,5-Bis(butylene)-tetrahydrofurfuryl alcohol (purified) | 1 | 0 | 6 | 21 | 6 | 2 | (²) | | |
| 56% 2-phenylcyclohexanol (Commercially available insect repellent as a control) | 1.25 | 50+ | 41 | (²) | | | | | |

[1] Concentration of chemical in acetone solution employed in impregnation of porous strips.
[2] Molasses completely consumed.

EXAMPLE 3

Two identical shelters made from pint cardboard cartons were placed in an inverted position in a wire cage 18 x 10 x 9 inches. The cartons had a notch cut in the rim to permit roaches to enter. Food and water were provided within the wire cage.

Five cc. of acetone was mixed with 1 cc. of a one percent solution of 2,3,4,5-bis(butylene)tetrahydrofurfural, prepared by the hydrogenation of 2,3,4,5-bis($\Delta^2$-butenylene)tetrahydrofurfural with $H_2$ over a palladium catalyst, as described in Example 5 of copending application of J. C. Hillyer, Serial No. 396,321, filed December 4, 1953. The mixture was placed in a carton, and the carton was revolved until the solution coated the entire inner surface thereof. The acetone was then allowed to evaporate completely. The other carton was untreated.

Ten young adult roaches *Periplaneta americana* were placed in the cage in a lighted room. This species of roach has an aversion to light and all sought shelter in the untreated carton. The roaches completely avoided the treated carton for three days.

EXAMPLE 4

Each of two identical shelters made from pint cardboard cartons, and containing food and water, was connected by means of a glass tube 22 mm. x 5 inches in size to a central cylindrical wire screen cage 3 inches in diameter and 10 inches long. The glass tubes entered the cylinder at the center of screw-type lids, one tube entering at each end. The inside of the lid was fitted with a removable disk of porous paper identical in size with the inside of the lid. The entire assemblage rested on a board.

Three cc. of a one percent acetone solution of the chemical being tested as a cockroach repellent was placed in one carton. The carton was revolved until the solution coated the entire inner surface thereof. The acetone was then allowed to evaporate completely. The disk of paper from the end of the cylindrical cage adjacent to the treated carton was impregnated with 1 cc. of a one percent acetone solution of the same chemical, and after evaporation of the acetone, was placed inside the lid. When only one compound was tested, the second carton and disk were left untreated. When it was desired to compare two compounds the second carton and second disk were impregnated in a similar manner with a second chemical.

Ten roaches of the species being tested were then placed in the central wire cage. Counts were made at intervals of one or two days to determine the number of roaches in the treated carton, the number in the untreated carton, and the number outside the cartons.

The results of tests of purified 2,3,4,5-bis($\Delta^2$-butenylene)tetrahydrofurfuryl alcohol as a repellent against three species of cockroaches, namely, the German cockroach *Blatella germanica* (Linné), the Oriental cockroach *Blatella orientalis* (Linné), and the American cockroach *Periplaneta americana* (Linné) are given in Table 3.

The material used was prepared according to the method described in Example 1 of Serial No. 255,520, the copending application of John C. Hillyer, filed November 8, 1951.

*Table 3*

REPELLENCY OF 2,3,4,5-BIS($\Delta^2$-BUTENYLENE)TETRAHYDROFURFURYL ALCOHOL (PURIFIED)

| Species of Roach | Location of Roach | Number of Roaches in Designated Place | | | | | | | |
|---|---|---|---|---|---|---|---|---|---|
| | | 1 Day | 2 Days | 3 Days | 4 Days | 5 Days | 6 Days | 8 Days | 10 Days |
| American | Treated Carton | 0 | 0 | 0 | 0 | 0 | 0 | 0 | 0 |
| | Outside Carton | 4 | 3 | 6 | 10 | 6 | 5 | 4 | 0 |
| | Untreated Carton | 6 | 7 | 4 | 0 | 4 | 5 | 6 | 10 |
| Oriental | Treated Carton | 0 | 0 | 0 | 0 | 0 | 0 | 0 | 0 |
| | Outside Carton | 10 | 2 | 7+*(2) | 4+(3) | 4+(3) | 3+(3) | 4+(3) | 3 |
| | Untreated Carton | 0 | 8 | 1 | 3 | 3 | 4 | 3 | 7 |
| German | Treated Carton | 0 | 0 | 0 | 0 | 0 | 0 | 0 | 0 |
| | Untreated Carton | 3+(1) | 2+(2) | 1+(3) | 0+(4) | 0+(4) | 0+(4) | 0+(4) | 0+(4) |
| | Outside Carton | 6 | 6 | 6 | 6 | 6 | 6 | 6 | 6 |

*Number in parentheses indicates dead cockroaches.

EXAMPLE 5

Tests similar to those described in Example 4 were made, with the exception that the second carton and disk, instead of being left untreated, were impregnated with a second compound in order to obtain information as to the comparative repellency of the two compounds. The German cockroach *Blatella germanica* and the Oriental cockroach *Blatella orientalis* were the species used in the tests. The results are shown in the table below. The 2,3,4,5-bis($\Delta^2$-butenylene)tetrahydrofurfuryl alcohol was prepared according to the Example 1 of Serial No. 255,520, the copending application of John C. Hillyer, filed November 8, 1951.

*Table 4*

REPELLENCY OF VARIOUS CHEMICALS TO COCKROACHES

| Species of Roach | Days | Number of Roaches in Designated Place | | |
|---|---|---|---|---|
| | | Carton #1 Treated With Compound A* | Outside Cartons | Carton #2 Treated With Compound B* |
| German | 1 | 0 | 10 | 0 |
| | 2 | 0 | 9 (+1) | 0 |
| | 3 | 0 | 5 (+5) | 0 |
| Oriental | 1 | 0 | 10 | 0 |
| | 2 | 0 | 10 | 0 |
| | 3 | 2 | 8 | 0 |

*Compound A=2,3,4,5-bis($\Delta^2$-butenylene)tetrahydrofurfuryl alcohol (purified). Compound B=2,3,4,5-bis($\Delta^2$-butenylene)tetrahydrofurfuryl alcohol (crude).

EXAMPLE 6

2,3,4,5 - bis($\Delta^2$-butenylene)tetrahydrofurfuryl alcohol was tested in the laboratory as a tick repellent. The procedure was as follows: A filter paper 9 cm. in diameter was divided into quadrants the opposite two of which were treated with a one percent solution of the chemical in acetone. After drying over night, the paper thus treated was placed in a Petri dish 10 cm. in diameter, and 50 to 70 ticks of *Dermocentor albipictus* (horse tick) in the larval stage were placed on the paper. The following day the number of live ticks on the treated and untreated areas was recorded. After the ticks were removed from the paper it was hung on a line until tested again after 48 hours, 1 week, and two weeks. The effectiveness of the chemical was expressed as the index of repellency obtained from the following formula:

$$100 - \frac{(\text{Number of ticks on treated area})(100)}{\text{Total number of ticks}} =$$

repellency index

Three replicates were run. The results are given in Table 5.

Table 5
REPELLENCY OF 2,3,4,5-BIS($\Delta^2$-BUTENYLENE)TETRAHYDROFURFURYL ALCOHOL TO TICKS

| Species of Tick | Days | Repellency Index |
|---|---|---|
| Dermocentor albipictus | 1 | 76 |
|  | 2 | 77 |
|  | 7 | 93 |
|  | 14 | 58 |

The compounds described by formula in the specification and claims herein, were prepared by the respective methods set forth in the copending applications referred to hereinabove.

Reasonable variation and modification are possible within the foregoing disclosure and the appended claims to the invention, the essence of which is insect repellents containing at least one of the group of 2,3,4,5-bis($\Delta^2$-butenylene)tetrahydrofurfuryl alcohol, 2,3,4,-5-bis(butylene)tetrahydrofurfuryl alcohol, and 2,3,4,5-bis(butylene)-tetrahydrofurfural, and defined derivatives of these compounds, as essential active ingredients; a method employing such repellent materials to render a surface or area insect repellent; and, areas rendered insect repellent by virtue of deposition thereon of a repellent material above described.

We claim:

1. A method for repelling an insect from an area comprising applying 2,3,4,5-bis($\Delta^2$-butenylene)tetrahydrofurfuryl alcohol to said area.

2. A method for repelling an insect from an area by applying 2,3,4,5-bis(butylene)tetrahydrofurfuryl alcohol to said area.

3. A method for repelling an insect from an area by applying 2,3,4,5-bis(butylene)tetrahydrofurfural to said area.

4. A method for repelling roaches comprising placing on the surface of an area likely to be inhabited by roaches, 2,3,4,5-bis($\Delta^2$-butenylene)tetrahydrofurfuryl alcohol, in an amount sufficient to repel roaches therefrom.

5. A method for repelling roaches comprising placing on the surface of an area likely to be inhabited by roaches, 2,3,4,5-bis(butylene)tetrahydrofurfural, in an amount sufficient to repel roaches therefrom.

6. A method for repelling flies comprising placing on the surface of an area likely to be inhabited by flies, 2,3,4,5-bis($\Delta^2$-butenylene)tetrahydrofurfuryl alcohol, in an amount sufficient to repel flies therefrom.

7. A method for repelling an insect from an area comprising applying to said area a polycyclic compound having a characteristic structure selected from a group consisting of

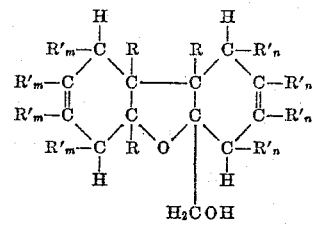

FORMULA I

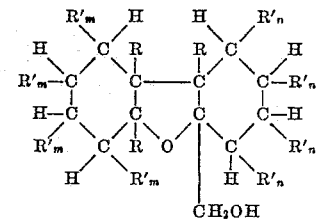

FORMULA II

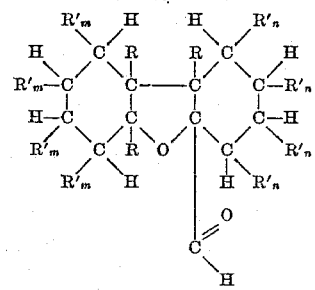

FORMULA III wherein each R is a radical selected from the group consisting of hydrogen and methyl and at least one R is hydrogen, wherein each R' is a radical selected from the group consisting of hydrogen and an alkyl group having not more than three carbon atoms, wherein the sum of the carbon atoms in the R'm and R'n radicals is in each case not greater than three and wherein at least two of the R'm and at least two of the R'n radicals are hydrogen.

8. The method of claim 7 wherein from 5 to 50 grams of said compound are applied per 100 square feet of said area.

9. The method of claim 7 wherein said compound is dissolved in an organic solvent.

10. The method of claim 9 wherein said organic solvent is acetone.

References Cited in the file of this patent

UNITED STATES PATENTS 2,572,577  Tissol _____ Oct. 23, 1951